US009542611B1

(12) United States Patent
Mikhael

(10) Patent No.: US 9,542,611 B1
(45) Date of Patent: Jan. 10, 2017

(54) LOGO DETECTION FOR MACROBLOCK-BASED VIDEO PROCESSING

(75) Inventor: Rafik Mikhael, Livermore, CA (US)

(73) Assignee: Harmonic, Inc., San Jose, CA (US)

( * ) Notice: Subject to any disclaimer, the term of this patent is extended or adjusted under 35 U.S.C. 154(b) by 248 days.

(21) Appl. No.: 13/208,303

(22) Filed: Aug. 11, 2011

(51) Int. Cl.
*H04N 7/50* (2006.01)
*G06K 9/32* (2006.01)

(52) U.S. Cl.
CPC .............. *G06K 9/325* (2013.01); *G06K 9/3266* (2013.01)

(58) Field of Classification Search
None
See application file for complete search history.

(56) References Cited

U.S. PATENT DOCUMENTS

| | | | | |
|---|---|---|---|---|
| 6,567,128 B1 * | 5/2003 | Webb | ................... | H04N 19/176 348/584 |
| 2004/0190611 A1 * | 9/2004 | Nakajima | ............ | H04N 19/159 375/240.03 |
| 2005/0078222 A1 * | 4/2005 | Liu | ........................ | H04N 5/147 348/700 |
| 2007/0230583 A1 * | 10/2007 | Horowitz | ............. | H04N 19/159 375/240.24 |
| 2011/0310295 A1 * | 12/2011 | Chen | .................... | H04N 19/577 348/441 |
| 2012/0177249 A1 * | 7/2012 | Levy | ...................... | G06K 9/325 382/103 |

* cited by examiner

*Primary Examiner* — Christopher S Kelley
*Assistant Examiner* — Kaitlin A Retallick
(74) *Attorney, Agent, or Firm* — Brokaw Patent Law PC; Christopher J. Brokaw

(57) ABSTRACT

The subject matter of this specification can be embodied in, among other things, a method that includes receiving a current frame, the current frame including one or more macroblocks, analyzing the current frame using a first set of image characteristics to determine if logo detection can be performed on the current frame, and performing the logo detection on the current frame if the current frame satisfies the first set of image characteristics to determine presence of a logo macroblock among the one or more macroblocks.

15 Claims, 10 Drawing Sheets

LOGO DETECTION FOR MACROBLOCK-BASED VIDEO PROCESSING

TECHNICAL FIELD

The subject matter of this application is generally related to video and image processing.

BACKGROUND

Video data transmission has become increasingly popular, and the demand for video streaming also has increased as digital video provides significant improvement in quality over conventional analog video in creating, modifying, transmitting, storing, recording and displaying motion videos and still images. A number of different video coding standards have been established for coding these digital video data. The Moving Picture Experts Group (MPEG), for example, has developed a number of standards including MPEG-1, MPEG-2 and MPEG-4 for coding digital video. Other standards include the International Telecommunication Union Telecommunications (ITU-T) H.264 standard and associated proprietary standards. Many of these video coding standards allow for improved video data transmission rates by coding the data in a compressed fashion. Compression can reduce the overall amount of video data required for effective transmission. Most video coding standards also utilize graphics and video compression techniques designed to facilitate video and image transmission over low-bandwidth networks.

Video compression technology, however, can cause visual artifacts that severely degrade the visual quality of the video. One artifact that degrades visual quality is blockiness. Blockiness manifests itself as the appearance of a block structure in the video. One conventional solution to remove the blockiness artifact is to employ a video deblocking filter during post-processing or after decompression. Conventional deblocking filters can reduce the negative visual impact of blockiness in the decompressed video. These filters, however, generally require a significant amount of computational complexity at the video decoder and/or encoder, which translates into higher cost for obtaining these filters and intensive labor in designing these filters.

SUMMARY

In general, this document describes the processing of fields and frames of video for the purposes of video compression, wherein subregions of the fields and frames are identified to be processed differently from other subregions.

In a first aspect, a method includes receiving a current frame, the current frame including one or more macroblocks, analyzing the current frame using a first set of image characteristics to determine if logo detection can be performed on the current frame, and performing the logo detection on the current frame if the current frame satisfies the first set of image characteristics to determine presence of a logo macroblock among the one or more macroblocks.

Various implementations may include some, all, or none of the following features. Analyzing the current frame may include analyzing whether the current frame is a forward-predictive frame, and performing the logo detection may include performing the logo detection on the current frame if the current frame is the forward-predictive frame. Analyzing the current frame may include determining whether the current frame has at least one reference frame that is a field-pair complement, and performing the logo detection may include performing the logo detection if the at least one reference frame is not a field-pair complement. Analyzing the current frame may include analyzing whether global motion between the current frame and the reference frame satisfies a predetermined speed threshold, and performing the logo detection may include performing the logo detection if the global motion between the current frame and the reference frame satisfies a predetermined speed threshold. Analyzing the current frame may include analyzing whether the current frame and the reference frame is separated by a scene change, and performing the logo detection may include performing the logo detection if the current frame and the reference frame is not separated by a scene change. Analyzing the current frame may include analyzing whether the current frame or the reference frame is associated with a flash, fade or dissolve, and performing the logo detection may include performing the logo detection if the current frame or the reference frame is not associated with a flash, fade or dissolve. The method may further comprise identifying a macroblock in the current frame including identifying a matching macroblock in a reference frame, identifying a motion vector that points to the matching macroblock in the reference frame, and determining the encoded macroblock as the logo macroblock if both vertical component and horizontal component of the motion vector do not meet a predetermined magnitude. Determining the macroblock may further include determining the macroblock in the current frame as the logo macroblock when both of the vertical component and the horizontal component of the motion vector do not meet a predetermined magnitude, and the encoded macroblock has a luma variance, texture or edges that meet a predetermined threshold. If the current frame does not satisfy the first set of image characteristics, the method may further comprise enabling usage detection using a previously detected bitmap storing results of the logo detection associated with one or more previous detection frames to determine the presence of the logo macroblock for the current frame. The method may further comprise re-performing the logo detection on the current frame to replace the previously detected bitmap with logo detection results associated with the current frame. The method may further comprise identifying a previous detection frame, analyzing the current frame to determine if the current frame has at least one of a same size, structure or parity as the previous detection frame, and determining a macroblock in the current frame as the logo macroblock if a corresponding macroblock in the previous detection frame has previously been identified as a logo macroblock. Determining the macroblock may further include determining the macroblock in the current frame as the logo macroblock when the corresponding macroblock in the previous detection frame has previously been identified as a logo macroblock, and the macroblock in the current frame has a luma variance, texture or edges that meet a predetermined threshold.

In a second aspect, a method includes receiving a current frame, analyzing a macroblock associated with the current frame using a first set of image characteristics to determine whether the macroblock is a logo macroblock, analyzing the logo macroblock associated with the current frame using a second set of image characteristics to determine whether a bit in a bitmap should be set, and setting the bit in a bitmap corresponding to a parity if it is determined that the bit should be set based on the second set of image characteristics, the bitmap having a number of bits corresponding to a number of macroblocks associated with the current frame for storing logo detection decision for each macroblock.

Various implementations may include some, all, or none of the following features. Analyzing the macroblock may include determining whether the macroblock has a texture variance that meets a predetermined threshold, and the method may further comprise identifying the macroblock as the logo macroblock if the macroblock has a texture variance that meets the predetermined threshold. The method may further comprise performing a post-process on the current frame after performing the logo detection to remove isolated detection decision or to detect a previously non-detected macroblock surrounded by one or more positively detected macroblocks. The systems and techniques described here may provide one or more of the following advantages. First, a system can provide an improved appearance of compressed video, especially video that includes static images overlaid on a moving background. Second, subregions of a video image that include both static and dynamic video content may be identified for processing in a way that reduces visible boundary artifacts in the video image.

The details of one or more implementations are set forth in the accompanying drawings and the description below. Other features and advantages will be apparent from the description and drawings, and from the claims.

DETAILED DESCRIPTION

Figure 1:
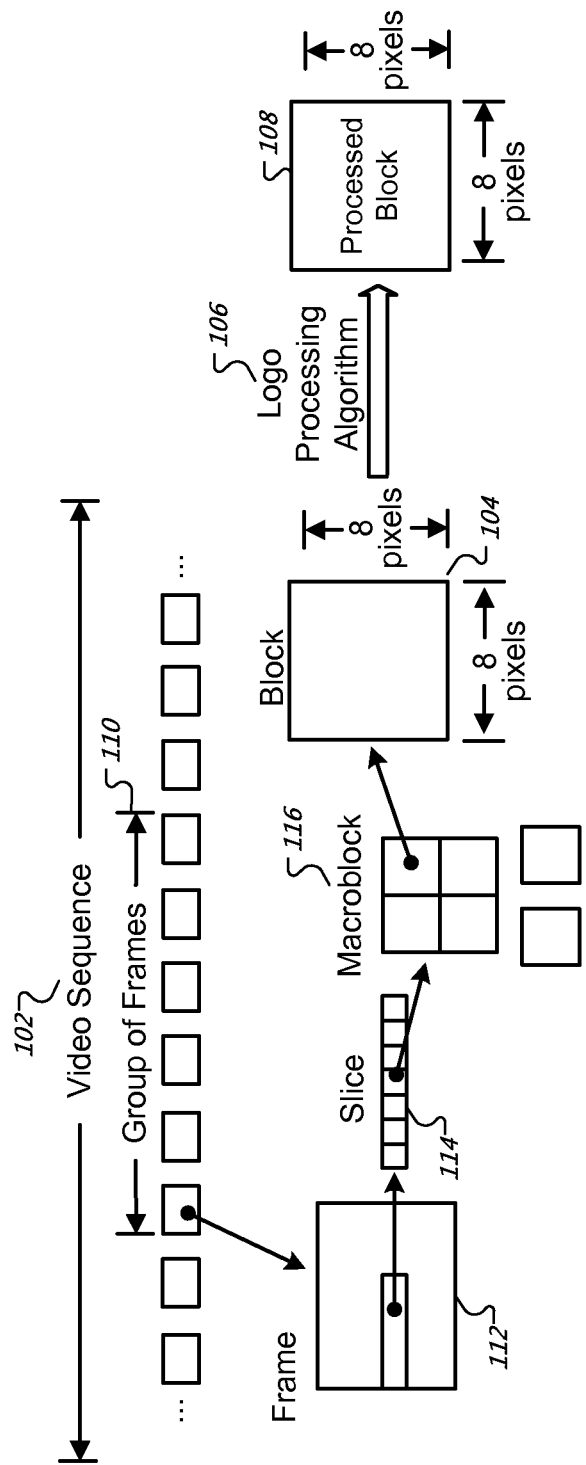
FIG. 1 is a block diagram of a video bitstream used in an example digital video coding standard whose block components can be deblocked using a deblocking algorithm, resulting in a filtered block.

FIG. 1 is a block diagram showing the processing of a video bitstream, which can also be referred to as a video sequence 102. The video sequence 102 can include a group of frames 110. An individual frame 112 can be processed to identify a slice 114. Included within a slice are one or more macroblocks 116. An individual block 104 of the macroblock 116 can be processed by a logo processing algorithm 106 to produce a processed block 108. For example, a sequence of frames can represent a digital video stream of data, where each frame includes an array of pixels. Uncompressed digital video data can result in large amounts of data that if stored for future viewing, for example, may require large amounts of data storage space (e.g., disk space or memory space). Additionally, for example, if a device transmits the uncompressed digital video data to another device, long transmissions times can occur due to the large amount of data transferred. Therefore, video compression can be used to reduce the size of the digital video data, resulting in reduced data storage needs and faster transmission times.

For example, an MPEG-2 coded video is a stream of data that includes coded video sequences of groups of frames. The MPEG-2 video coding standard can specify the coded representation of the video data and the decoding process required to reconstruct the frames resulting in the reconstructed video. The MPEG-2 standard aims to provide broadcast as well as HDTV image quality with real-time transmission using both progressive and interlaced scan sources.

In the implementation of FIG. 1, a video sequence 102 can include one or more sequence headers. The video sequence 102 can include one or more groups of frames (e.g., group of frames 110), and can end with an end-of-sequence code. The group of frames (GOF) 110 can include a header and a series of one or more frames (e.g., frame 112). A frame (e.g., frame 112) can be a primary coding unit of a video sequence (e.g., video sequence 102). In some implementations, a frame can be represented by three rectangular matrices. One matrix can represent the luminance (Y) component of the frame. The remaining two matrices can represent the chrominance values (Cr and Cb).

In some implementations, the luminance matrix can have an even number of rows and columns. Each chrominance matrix can be one-half the size of the luminance matrix in both the horizontal and vertical direction because of the subsampling of the chrominance components relative to the luminance components. This can result in a reduction in the size of the coded digital video sequence without negatively affecting the quality because the human eye is more sensitive to changes in brightness (luminance) than to chromaticity (color) changes.

In some implementations, a frame (e.g., frame 112) can be divided into a plurality of horizontal slices (e.g., slice 114), which can include one or more contiguous macroblocks (e.g., macroblock 116). For example, in 4:2:0 video frame, each macroblock includes four 8×8 luminance (Y) blocks, and two 8×8 chrominance blocks (Cr and Cb). If an error occurs in the bitstream of a slice, a video decoder can skip to the start of the next slice and record the error. The size and number of slices can determine the degree of error concealment in a decoded video sequence. For example, large slice sizes resulting in fewer slices can increase decoding throughput but reduce frame error concealment. In another example, smaller slice sizes resulting in a larger number of slices can decrease decoding throughput but improve frame error concealment. Macroblocks can be used as the units for motion-compensated compression in an MPEG-2 coded video sequence.

A block (e.g., block 104) can be the smallest coding unit in an MPEG coded video sequence. For example, an 8×8 pixel block (e.g., block 104) can be one of three types: luminance (Y), red chrominance (Cr), or blue chrominance (Cb). In some implementations, visible boundary artifacts can occur in MPEG coded video streams. Boundary artifacts can occur due to the block-based nature of the coding algorithms used in MPEG video coding. These artifacts can lead to significantly reduced perceptual quality of the decoded video sequence in video regions in which static pixels are substantially adjacent to pixels that depict motion. An example of such artifacts can occur in video that depicts motion (e.g., a camera panning across a scene) upon which a logo, banner, score box, or any other appropriate overlay is superimposed. In examples such as these, boundary artifacts may be visible as a "halo" of pixels near the boundaries of the static image, especially when there is motion in the underlying video.

As shown in FIG. 1, the application of a logo detection algorithm 106 to selected pixels in blocks of an MPEG coded image can aid in reducing the appearance of boundary artifacts in the coded video. FIGS. 2-6 describe the logo processing algorithm 106 in greater detail.

Figure 2A:
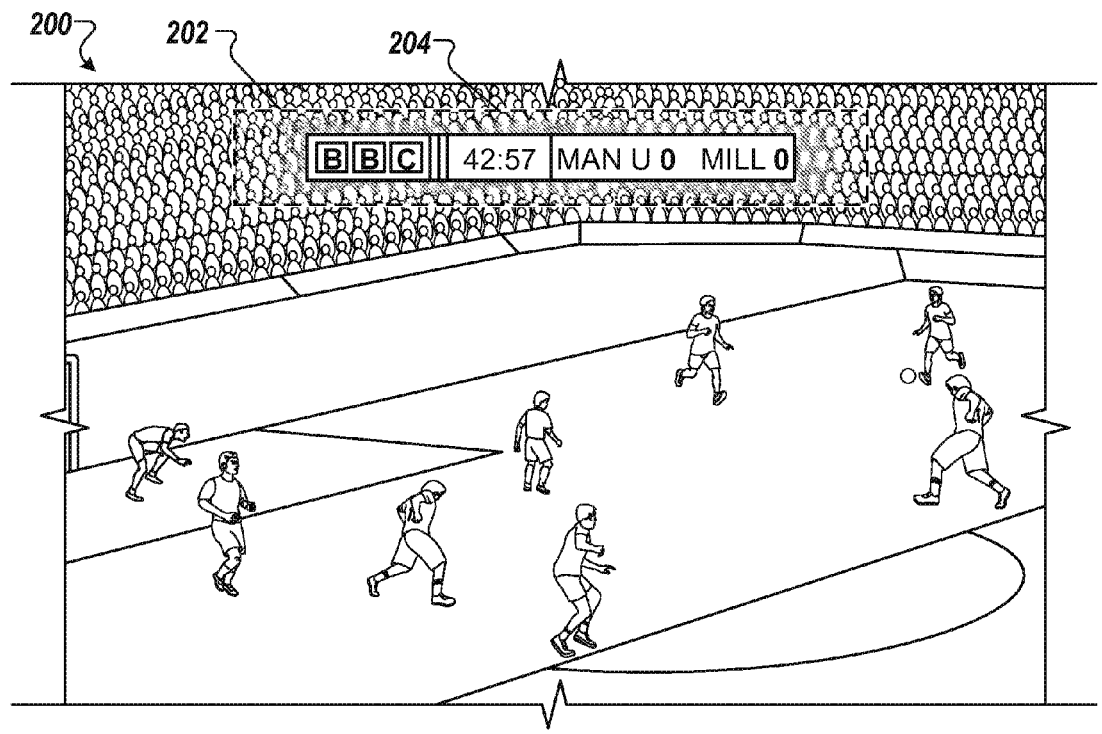
FIG. 2A is a screen shot of an example video scene in which a halo artifact is visible.

FIG. 2A shows a screen shot of an example video scene 200 in which a halo artifact is visible. In general, for block-based motion-compensated digital video compression standards (e.g. H.263, MPEG-2, H.264 AVC, H.265), superimposed partially-opaque static logos and graphics can suffer prediction failure and large prediction residual compared to non-logo blocks. These macroblocks show more noticeable visual artifacts compared to neighboring blocks encoded with the same quantization index and prediction techniques.

Logo macroblocks or subblocks can show a blurred "halo" around the logo area notably under conditions such as when opaque sharp logo edges do not substantially fall on macroblock boundaries, when the frame area outside of the logo but inside the same macroblock containing the logo edge is textured (e.g., possesses moderate to high luma variance), or when there is some camera pan or background motion such that the block-based motion estimation is substantially unable to find a suitable prediction for the area adjacent to the logo.

In some examples, intra-prediction of such blocks can still produce a large residual due to the textured nature of the logo and its surroundings. Further, static logos can allow a human eye to lock on, making any coding artifacts especially visible. Inefficient encoding of the block can provide a bad reference even when the above conditions cease to exist, until the following Intra frame is identified.

In the present example, the scene 200 depicts a soccer match as an example of a recorded event in which a substantial amount of motion may be captured (e.g., players running across the field, the throngs of cheering and waving fans, the camera panning across the playfield to keep the action within view). Included within the video scene 200 is a region 202. The region 202 includes a logo 204 and a collection of pixels 206 substantially adjacent to the logo 204. In general, the logo 204 includes a collection of pixels that are substantially static (e.g., change little between subsequent video frames), whereas the collection of pixels 206 outside of the logo 204 are relatively dynamic (e.g., change frequently from frame to frame).

Figure 2B:
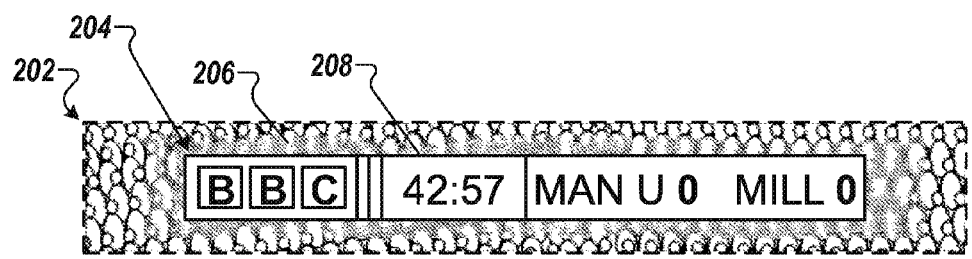
FIG. 2B is a detailed view of an example video scene in which a halo artifact is visible.

As shown in FIG. 2B, a boundary 208 between the pixels of the logo 204 and the collection of pixels 206 surrounds the logo 204. In some examples, the pixels of macroblocks and subblocks with which the boundary 208 intersects can be the macroblocks and subblocks that exhibit the boundary artifacts or "halos" described in this document. For example, some pixels of the collection of pixels 206 may exhibit an undesirable "static" visual quality (e.g., pixels that do not appear to move in coordination with the background scene, a twinkle effect), while some pixels of the logo 204 may exhibit an undesirable "dynamic" visual quality (e.g., pixels may appear to move or be altered as the background scene changes).

To solve this problem an encoder needs to detect such blocks in each frame, and to handle them differently from other textured macroblocks or subblocks that belong to the original video scene. The algorithms described here attempt the detection of moderate to high variance macroblocks/subblocks that contain or partially contain a static logo, in both reference and non-reference frames. This description, however, does not propose any specific handling of the detected macroblocks that may be needed to reduce their predicted residual error or enhance their compression efficiency.

The descriptions of FIGS. 3-6 discuss techniques for reducing or substantially eliminating the appearance of such boundary artifacts. Certain frames in a video sequence are used for detection of logo blocks. A bitmap with a number of bits equal to the number of blocks in the frame is used to store the detection decision for each block (e.g., "1" means a logo was detected, "0" means no logo was detected). Frames termed as "usage" frames can use the bitmap flag for each block to control whether to perform special handling on each block or not. Decisions of the usage frame do not overwrite the bitmap, but they are used for handling the block. A frame can be a detection only frame, a usage only frame, both, or neither.

FIGS. 3A-3D are a flow chart that shows an example process 300 for determining logo detection. In some implementations, the process 300 may be performed as part of the logo processing algorithm 106 of FIG. 1. The process 300 includes a number of decisions that are made based on the types of frames (or pictures) it is processing. Compressed video generally includes I-frames, P-frames, and B-frames. An I-frame (or picture) is an 'intra-coded' frame which is a fully-specified frame, similar to a conventional static image file. P-frames (or pictures) and B-frames (or pictures) hold only part of the image information, so they need less space to store than an I-frame, and thus improve video compression rates.

A "P" frame (or picture) generally holds only the changes in the image from a previous frame. For example, in the scene 200, when a soccer player runs across a stationary background, substantially only the player's movements need to be encoded. The encoder does not need to store the unchanging background pixels in the P-frame, thus saving space. In some implementations, P-frames can also be known as delta frames.

Figure 3A:
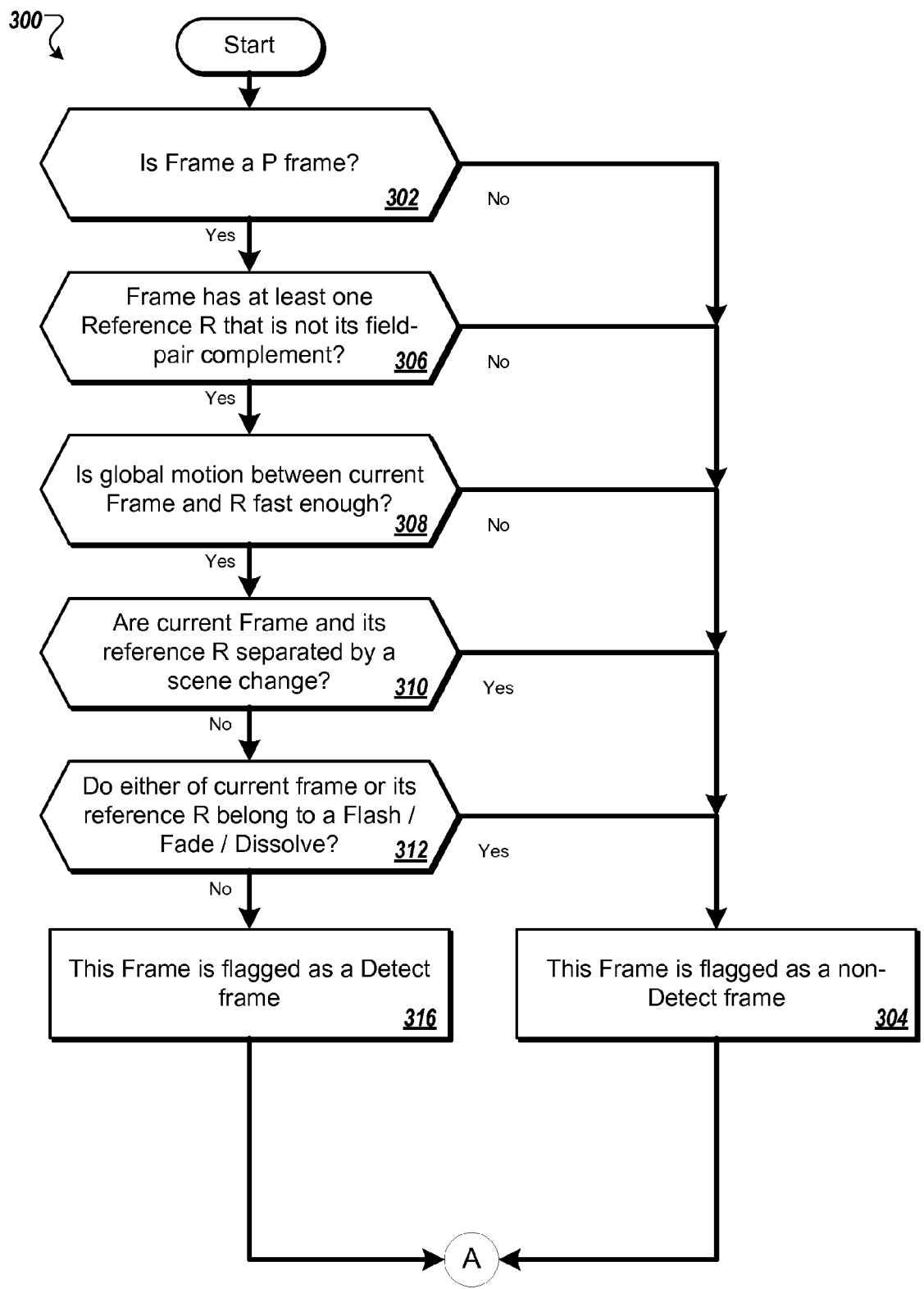
FIGS. 3A-3D are a flow chart that shows an example process for determining logo detection.

Referring to FIG. 3A, the process starts at step 302 where a determination is made whether a frame is a P-frame. If the frame is not a P-frame, then at step 304 the frame is flagged as a non-detect frame. If the frame is a P-frame, then at step 306 another determination is made. If at step 306, the frame does not have at least one reference "R" that is not its field pair content, then at step 304 the frame is flagged as a non-detect frame. If at step 306, the frame has at least one reference "R" that is not its field pair content, then another determination is made at step 308.

If at step 308, global motion between the current frame and "R" does not meet a predetermined threshold, then at step 304 the frame is flagged as a non-detect frame. If at step 308, global motion between the current frame and "R" meets a predetermined threshold, then another determination is made at step 310. In some implementations, the global motion threshold depends on the temporal distance between the current frame and the reference frame. In some implementation, the global motion threshold depends on the metric used to describe global motion, as well as the precision of motion-estimation (e.g., half-pixel, quarter-pixel, or ⅛ of a pixel). In some implementations, the global motion threshold can be optimized based on the design and characteristics of the video encoder.

If at step 310, the current frame and its reference "R" are separated by a scene change, then at step 304 the frame is flagged as a non-detect frame. If at step 310, the current frame and its reference "R" are not separated by a scene change, then another determination is made at step 312.

If at step 312, either of the current frame or its reference "R" belong to a "flash", a "fade", or a "dissolve" event, then at step 304 the frame is flagged as a non-detect frame. If at step 312, either of the current frame or its reference "R" do not belong to a "flash", a "fade", or a "dissolve" event, then then at step 316 the frame is flagged as a detect frame.

In some implementations, if it is determined that both the current frame and "R" do not have the same frame size, structure or parity, then at step 304 the frame is flagged as a non-detect frame. However, in some implementations, if it is determined that both the current frame and "R" have the same frame structure and parity, then at step 316 the frame is flagged as a detect frame.

In some implementations, a frame is an effective detect frame if the frame will be coded as a P frame with motion estimation performed on at least one forward reference that does not belong to its field pair (R reference), it falls within a moderate-to-fast motion scene (any metric that is correlated to the magnitude of median motion-vector component can be used). It belongs to the same scene as its R reference, the frame does not belong to a flash, fade, or dissolve, does not possess extremely high or extremely low variance, and does not fall on the boundary between field encoding and frame encoding. In some implementations, within a detection frame a subblock can be flagged as a logo block if the block has a moderate to high luma variance, texture, or sharp edges (block metrics correlated to sharp edges within the block are preferred), and the block has very small magnitude for both vertical and horizontal components of its motion estimated vectors pointing to its R reference inter-prediction.

Figure 3B:
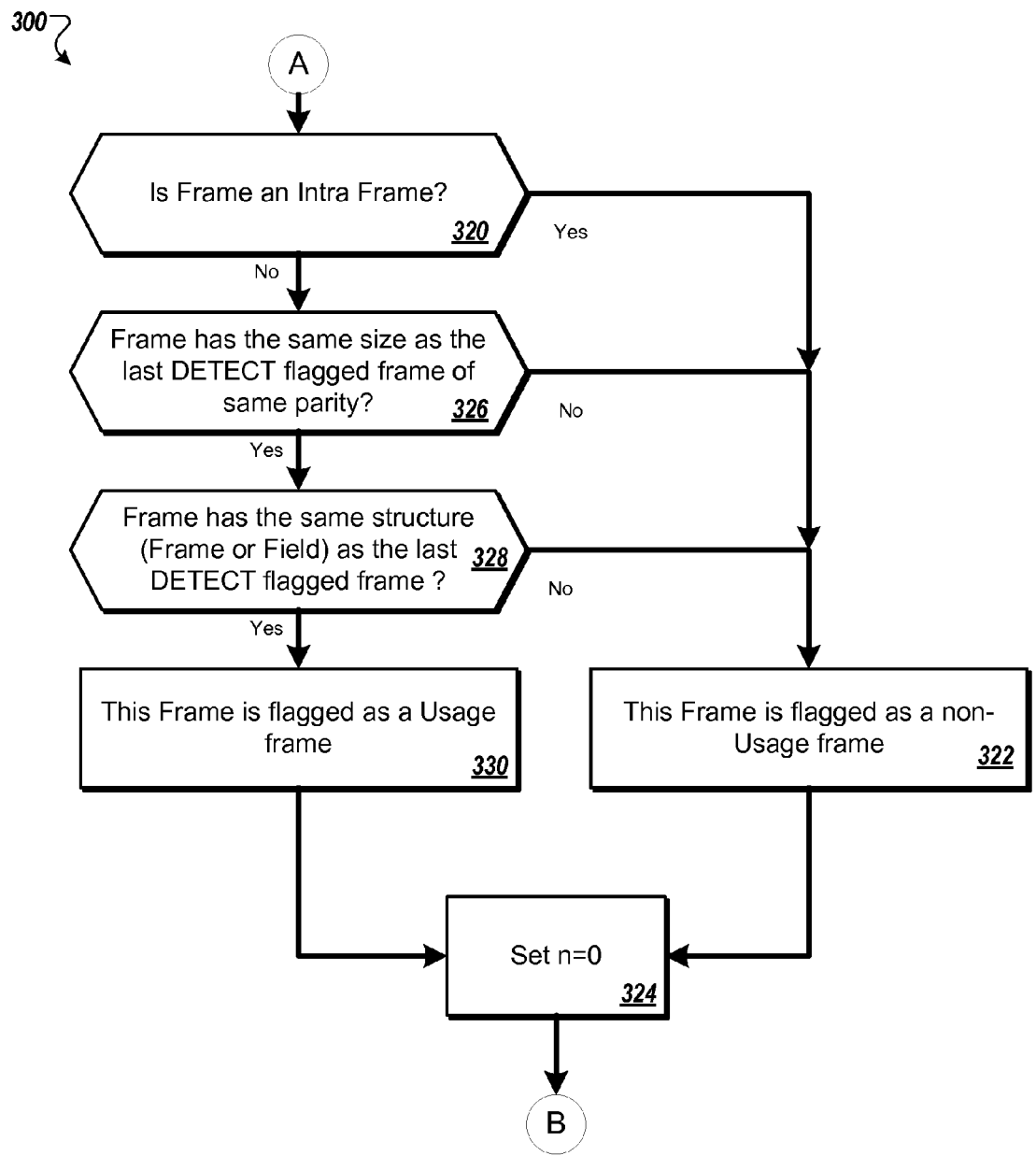

Referring now to FIG. 3B, the process 300 continues at step 320. At step 320 a determination is made whether the frame is an intra-frame (e.g., an I-frame). If so, then at step 322 the frame is flagged as a non-usage frame and a counter "n" is reset to zero at step 324. If not, another determination is made at step 326. If at step 326 the frame is determined not to have the same size as the last detect-flagged frame of the same parity, then at step 322 the frame is flagged as a non-usage frame. If at step 326 the frame is determined to have the same size as the last detect-flagged frame of the same parity, then another determination is made at step 328.

At step 328, a determination is made whether the frame does not have the same size, structure (e.g., frame or field), or parity as the last detect-flagged frame. If so, then at step 322 the frame is flagged as a non-usage frame. If the frame does has the same size, structure (e.g., frame or field), or parity as the last detect-flagged frame, then at step 330 the frame is flagged as a "usage" frame. At step 324 the counter "n" is reset to zero.

In some implementations, a frame can be an effective usage frame if the frame has the same size, field-or-frame frame structure, or parity as the last same-parity detection frame. This increases the likelihood that the flag corresponding to a co-located block is in the right place within the bitmap. In some implementations, within a usage frame a subblock can be flagged as a logo block if the subblock has a moderate to high luma variance, texture, or sharp edges, and its co-located subblock in the last same-parity detection frame was flagged as a logo block. In some implementations, block metrics correlated to sharp edges within the block may be preferred.

Figure 3C:
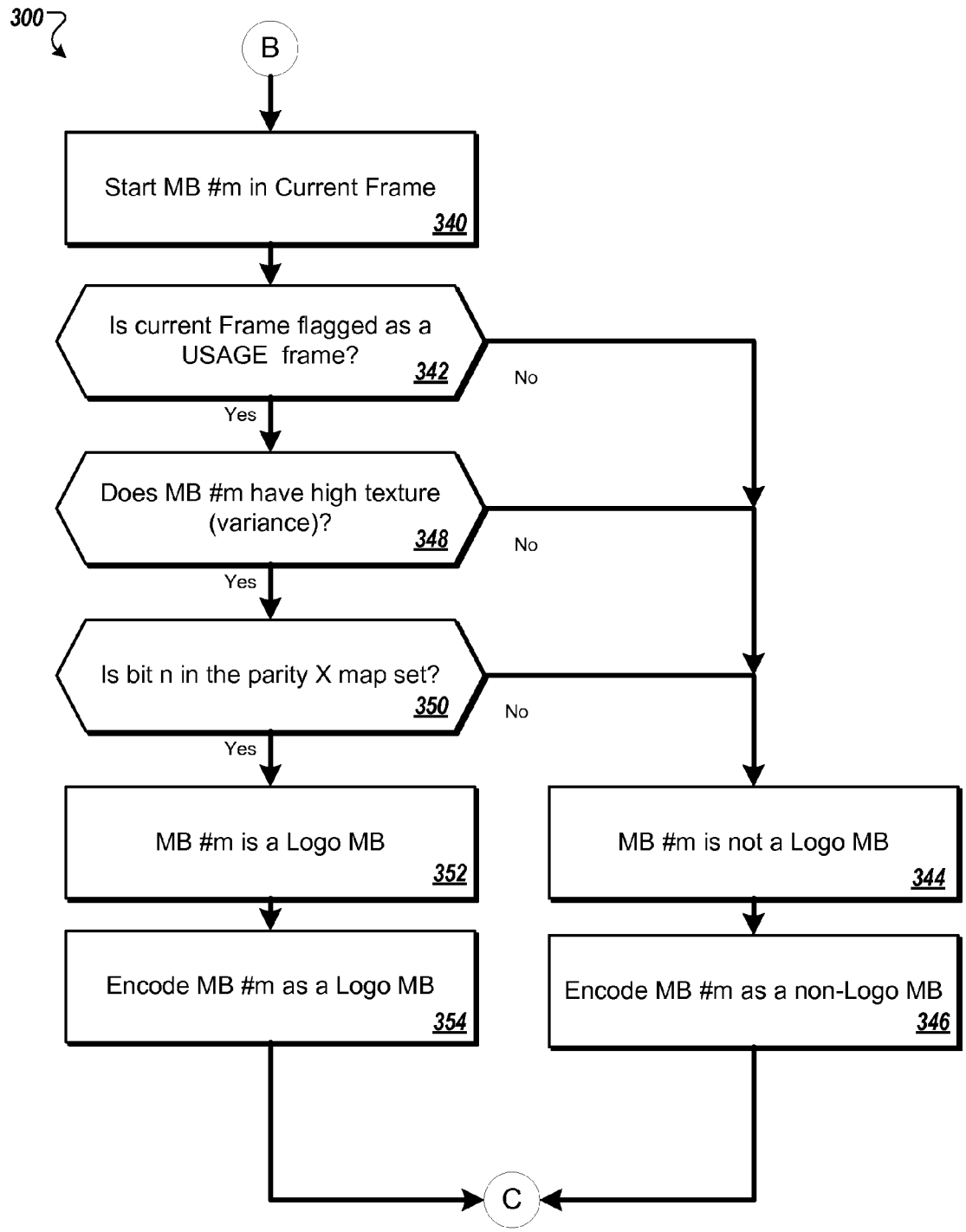

Referring now to FIG. 3C, the process continues at step 340. At step 340, a macroblock #m is selected in the frame. At step 342, if the current frame is not flagged as a usage frame, then at step 344 macroblock #m is identified as a non-logo macroblock. At step 346, the macroblock #m is encoded as a non-logo macroblock.

If, however, at step 342 the current frame is flagged as a usage frame, then another determination is made at step 348. If at step 348 the macroblock #m does not have a high texture (e.g., variance), then at step 344 macroblock #m is identified as a non-logo macroblock. Otherwise, if at step 348 the macroblock #m has a high texture (e.g., variance), then another determination is made at step 350.

At step 350, if the bit n in the parity X map is not set, then at step 344 macroblock #m is identified as a non-logo macroblock. If the bit n in the parity X map is set, then the macroblock #m is identified as a logo macroblock at step 352 and, in step 354, the macroblock #m is encoded as a logo macroblock. In some implementations, if frames are encoded as field pairs, one bitmap may be used for top-parity fields and another bitmap may be used for bottom-parity fields. In some implementations, for frame encoding, only one bitmap may be used with a size equal to the sum of the 2 field-bitmaps combined.

Figure 3D:
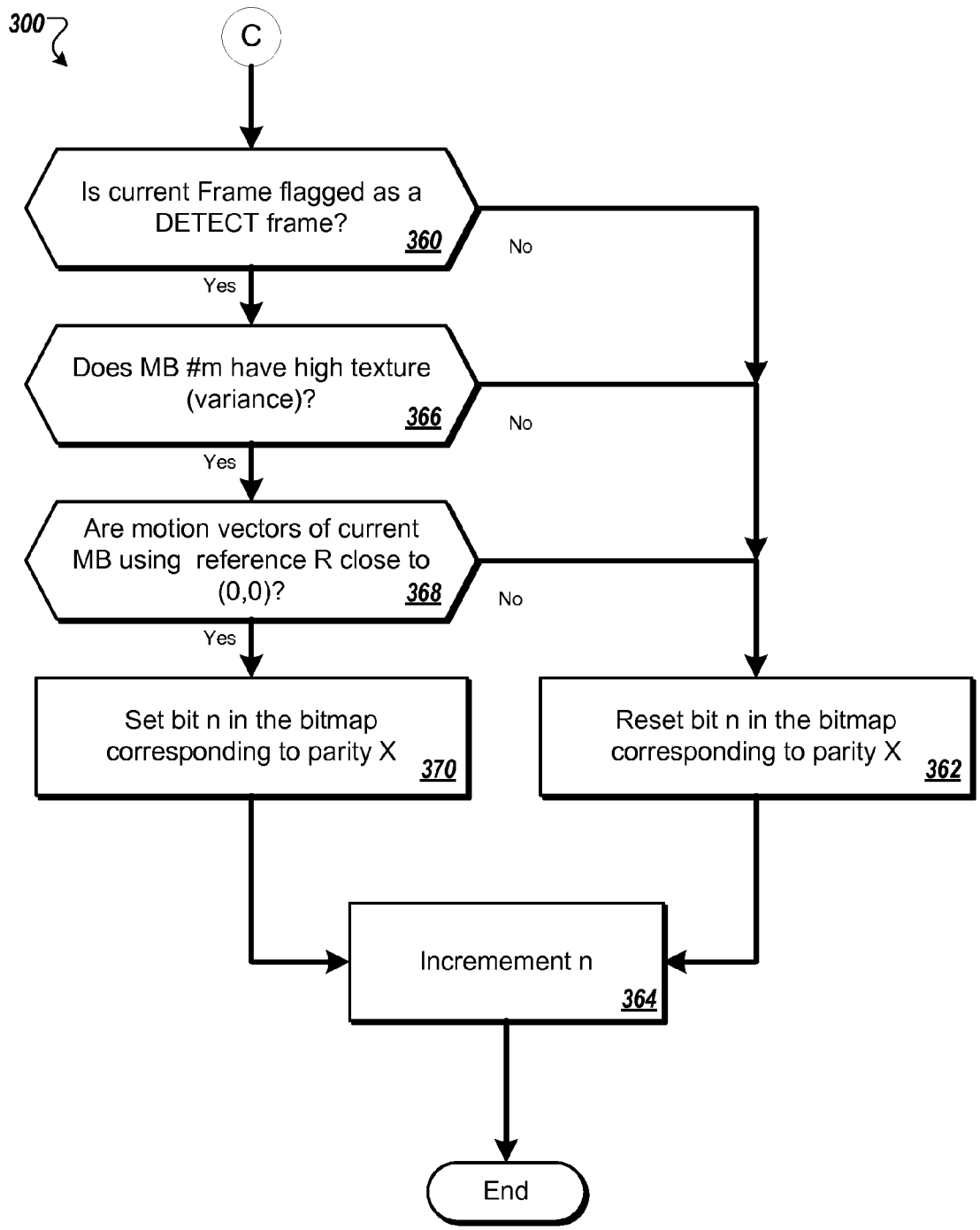

Referring now to FIG. 3D, the process 300 continues at step 360. At step 360, if the current frame is determined as not being flagged as a detect-frame, then at step 362 bit n in the bitmap corresponding to parity X is reset. At step 364, the value of n is incremented. If the current frame is determined to be flagged as a detect-frame at step 360, then another determination is made at step 366.

At step 366, if the macroblock #m does not have high texture (e.g., variance), then at step 362 bit n in the bitmap corresponding to parity X is reset. If at step 366, the macroblock #m has high texture, then another determination is made at step 368.

At step 368, if the motion vectors of the current macroblock using reference R are not determined to be close to (0,0), then at step 362 bit n in the bitmap corresponding to parity X is reset. If, however, the motion vectors of the current macroblock using reference R are determined to be close to (0,0), then at step 370 bit n in the bitmap corresponding to parity X is set. At step 364, the value of n is incremented. In some implementations, step 364 may loop back such that the process 300 continues at step 340 to process additional macroblocks.

Figure 4:
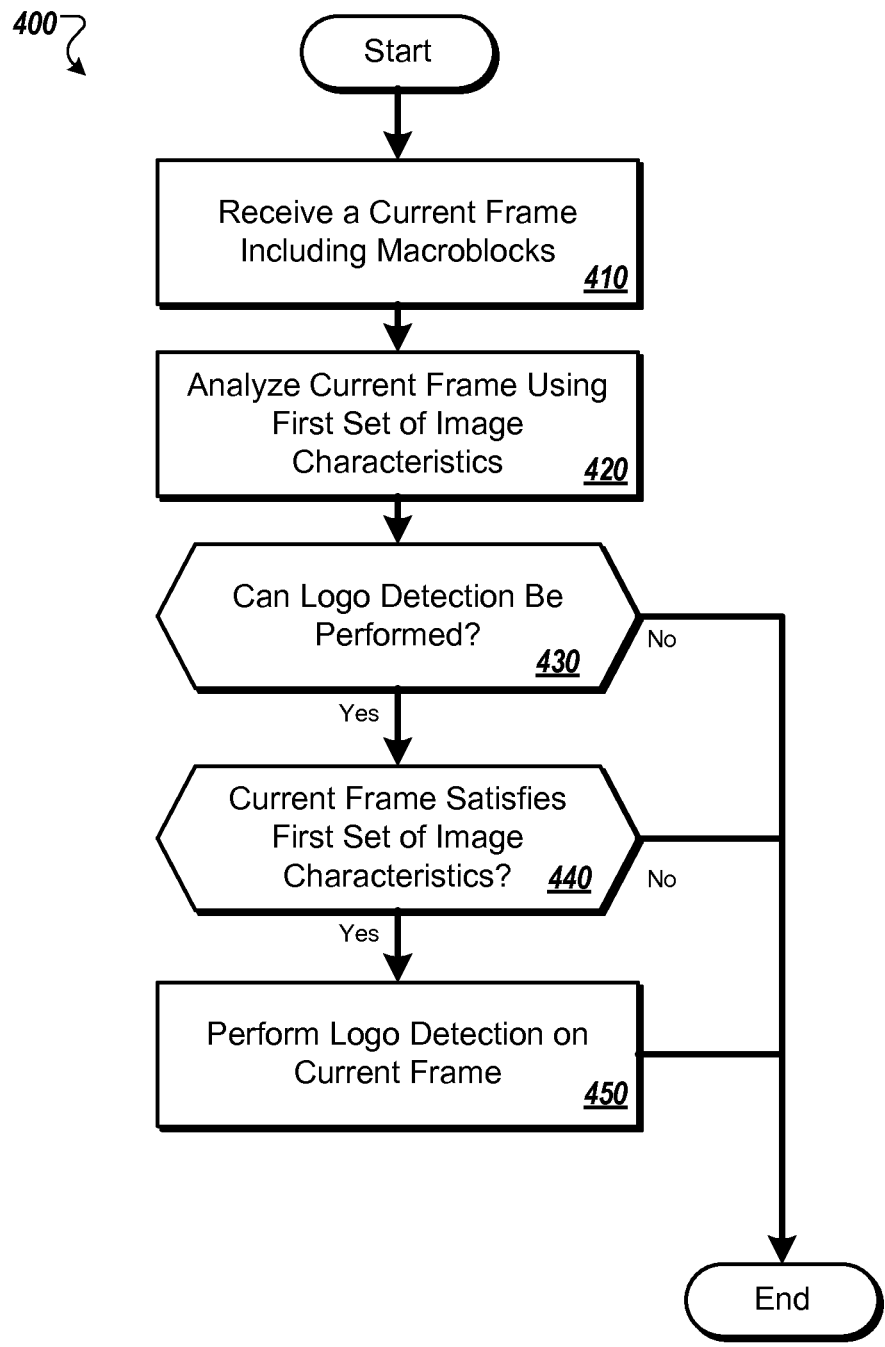
FIG. 4 is a flow chart that shows an example process for performing logo detection.

FIG. 4 is a flow chart that shows an example processes 400 for performing logo detection. In some implementations, the process 400 may be performed as part of the logo processing algorithm 106. At step 410 a current frame including macroblocks is received. For example, the frame 112, which includes macroblocks such as the macroblock 116, is received by the logo processing algorithm 106.

At step 420, the current frame is analyzed using a first set of image characteristics to determine if logo detection can be performed on the current frame. In some implementations, analyzing the current frame can include analyzing whether the current frame is a forward-predictive frame, and performing the logo detection can include performing the logo detection on the current frame if the current frame is the forward-predictive frame.

In some implementations, analyzing the current frame can include determining whether the current frame has at least one reference frame that is a field-pair complement, and performing the logo detection can include performing the logo detection if the at least one reference frame is not a field-pair complement.

In some implementations, analyzing the current frame can include analyzing whether global motion between the current frame and the reference frame satisfies a predetermined speed threshold, and performing the logo detection can include performing the logo detection if the global motion between the current frame and the reference frame satisfies a predetermined speed threshold. For example, an estimate of the camera speed can be determined when at least half of the frame's macroblocks have a motion vector whose X or Y components exceed 24 pixels, and if either of the X or Y components exceeds the predetermined speed threshold, then the motion can be determined as being fast enough for this frame to be a detect frame. In some implementations, the further the reference R (temporal distance), the slower the camera speed that may be needed to reach the predetermined speed threshold. In some implementations, analyzing the current frame can include analyzing whether the current frame and the reference frame is separated by a scene change, and performing the logo detection can include performing the logo detection if the current frame and the reference frame is not separated by a scene change.

At step 430, a determination is made as to whether logo detection can be performed. If the analysis of step 420 indicates that logo detection cannot be performed, then the process 400 ends. If at step 430, it is determined that logo detecting can be performed, then another determination is made at step 440.

If at step 440 the current frame does not satisfy the first set of image characteristics to determine presence of a logo macroblock among the one or more macroblocks, then the process 400 ends. If at step 440 the current frame satisfies the first set of image characteristics to determine presence of a logo macroblock among the one or more macroblocks, then at step 450, logo detection is performed on the current frame. In some implementations, the logo detection at step 450 can be re-performed on the current frame to replace the previously detected bitmap with logo detection results associated with the current frame.

In some implementations, if at step 440 the current frame does not satisfy the first set of image characteristics, the process 400 can include steps for enabling usage detection using a previously detected bitmap storing results of the logo detection associated with one or more previous detection frames to determine the presence of the logo macroblock for the current frame. In some implementations, if the current frame does not satisfy the first set of image characteristics at step 440, the process 400 can include identifying a previous detection frame, analyzing the current frame to determine if the current frame has at least one of a same size, structure or parity as the previous detection frame, and determining a macroblock in the current frame as the logo macroblock if a corresponding macroblock in the previous detection frame has previously been identified as a logo macroblock. In some implementations, determining the macroblock can also include determining the macroblock in the current frame as the logo macroblock when the corresponding macroblock in the previous detection frame has previously been identified as a logo macroblock, and the macroblock in the current frame has a luma variance, texture or edges that meet a predetermined threshold. For example, the variance of the macroblocks in a frame may be averaged to determine an average variance value, and a macroblock may be considered to have moderate variance when its variance approximates the average variance for the frame. In another example, a macroblock may be considered to have high variance when its variance is higher than the variance values of about 75% of the macroblocks in the frame.

In some implementations, analyzing the current frame at step 420 can include analyzing whether the current frame or the reference frame is associated with a flash, fade or dissolve, and performing the logo detection can include performing the logo detection if the current frame or the reference frame is not associated with a flash, fade or dissolve. In some implementations, analyzing the current frame can include analyzing whether the current frame and the reference frame have a same size, structure, or parity, and performing the logo detection can include performing the logo detection if the current frame and the reference frame have a same size, structure, or parity.

Figure 5:
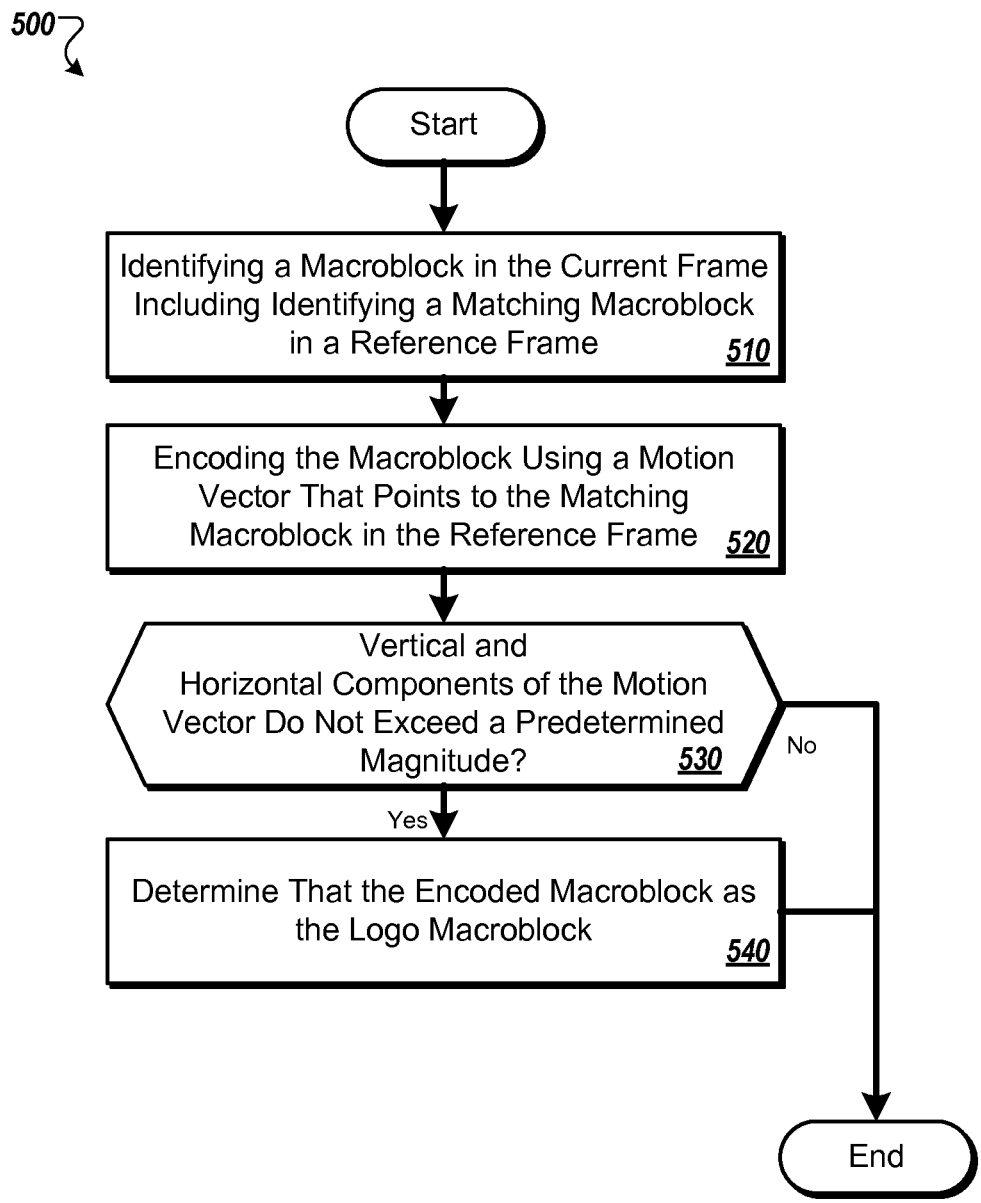
FIG. 5 is a flow chart that shows another example process for performing logo detection.

FIG. 5 is a flow diagram of a process 500. In some implementations, the process 500 can be performed following step 450 of FIG. 4. The process 500 starts at step 510 by identifying a macroblock in the current frame including identifying a matching macroblock in a reference frame. At step 520 a motion vector that points to the matching macroblock in the reference frame is identified.

At step 530 if both vertical component and horizontal component of the motion vector meet a predetermined magnitude (e.g., where both components are close to zero), then the process 500 ends. Otherwise, if both of the vertical component and the horizontal component of the motion vector do not meet a predetermined magnitude, then at step 540 the encoded macroblock is determined as the logo macroblock. In some implementations, the predetermined magnitude is derived based on the encoder, and based on the aggressiveness of the design application. In some implementations, a value of one pixel can be used for each of the vertical and horizontal components.

In some implementations, determining the macroblock can also include determining the macroblock in the current frame as the logo macroblock when both of the vertical component and the horizontal component of the motion vector do not meet a predetermined magnitude, and the encoded macroblock has a luma variance, texture or edges that meet a predetermined threshold.

Figure 6:
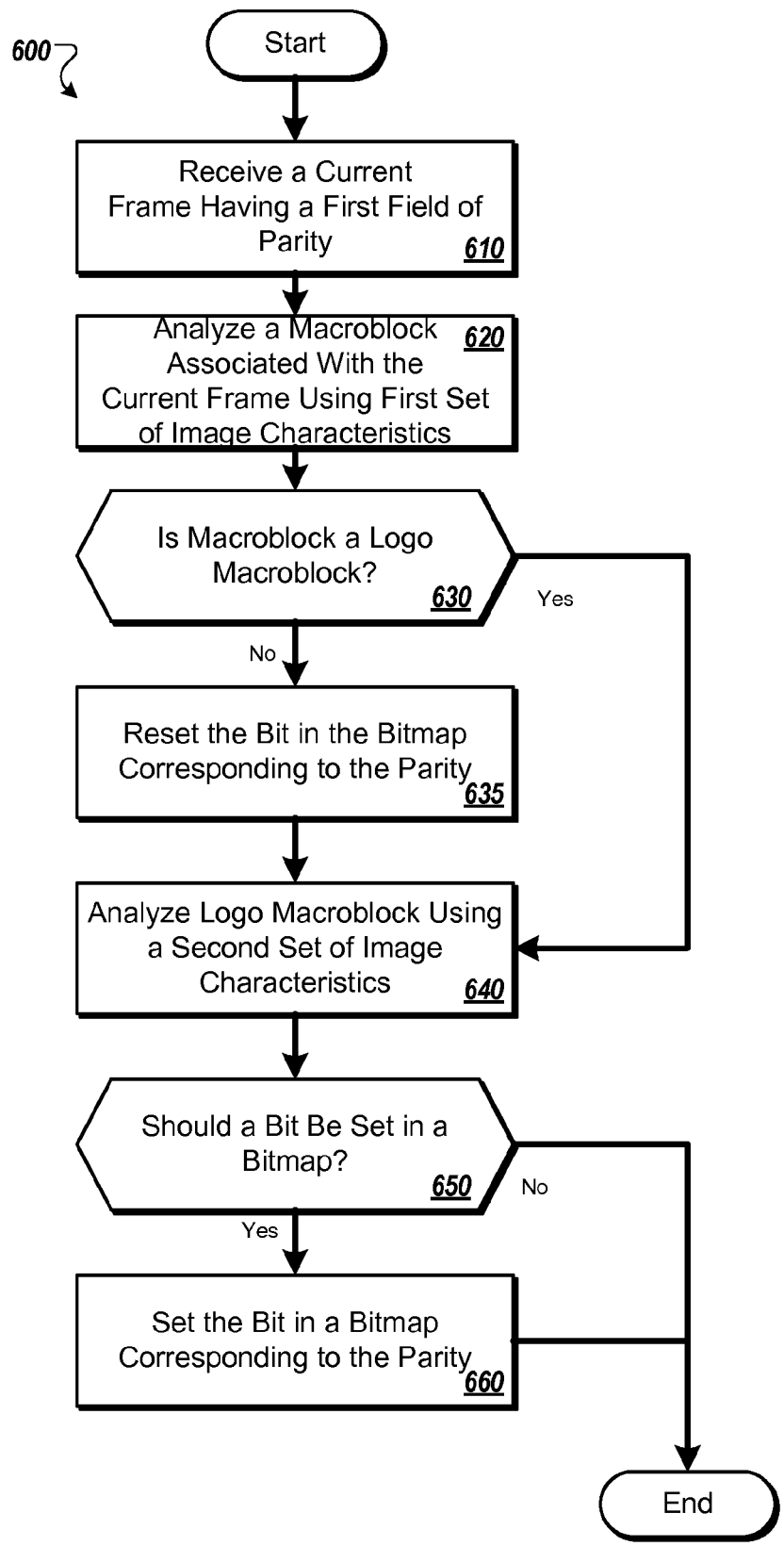
FIG. 6 is a flow chart that shows another example process for performing logo detection.

FIG. 6 is a flow diagram of a process 600. In some implementations, the process 600 may be performed by the logo processing algorithm 106 of FIG. 1. The process 600 starts at step 610 when current frame is received, the current frame having a frame or field of parity. At step 620, a macroblock associated with the current frame is analyzed using a first set of image characteristics to determine whether the macroblock is a logo macroblock.

If at step 630, the macroblock is determined not to be a logo macroblock, then at step 635 the bit is reset in the bitmap according to the parity. If, however, at step 630, the macroblock is determined to be a logo macroblock, then at step 640 the logo macroblock associated with the current frame is analyzed using a second set of image characteristics to determine whether a bit in a bitmap should be set.

If at step 650 it is determined that a bit in the bitmap should not be set based on the second set of image characteristics, then the process 600 ends. If at step 650 it is determined that a bit in the bitmap should be set, then at step 660 the bit is set in the bitmap corresponding to the parity, the bitmap having a number of bits corresponding to a number of macroblocks associated with the current frame for storing logo detection decision for each macroblock.

In some implementations, analyzing the macroblock at step 630 can include determining whether the macroblock has a texture variance that meets a predetermined threshold, and the process 600 can further include identifying the macroblock as the logo macroblock if the macroblock has a texture variance that meets the predetermined threshold.

In some implementations, analyzing the macroblock can include determining whether a bit corresponding to the macroblock in the bitmap is set, and the process 600 can also include identifying the macroblock as the logo macroblock if the bit corresponding to the macroblock in the bitmap is set. In some implementations, analyzing the macroblock can include determining whether the current frame is a usage frame that has a same size, structure, or parity as a previous detection frame of a same parity. In some implementations, analyzing the logo macroblock can include determining whether a motion vector associated with the current logo macroblock and a reference frame associated with the current frame is close to a center of origin, and the process 600 can also include setting the bit in the bitmap corresponding to the parity if it is determined that the motion vector associated with the current logo macroblock and the reference frame associated with the current frame is close to the center of origin.

Figure 7:
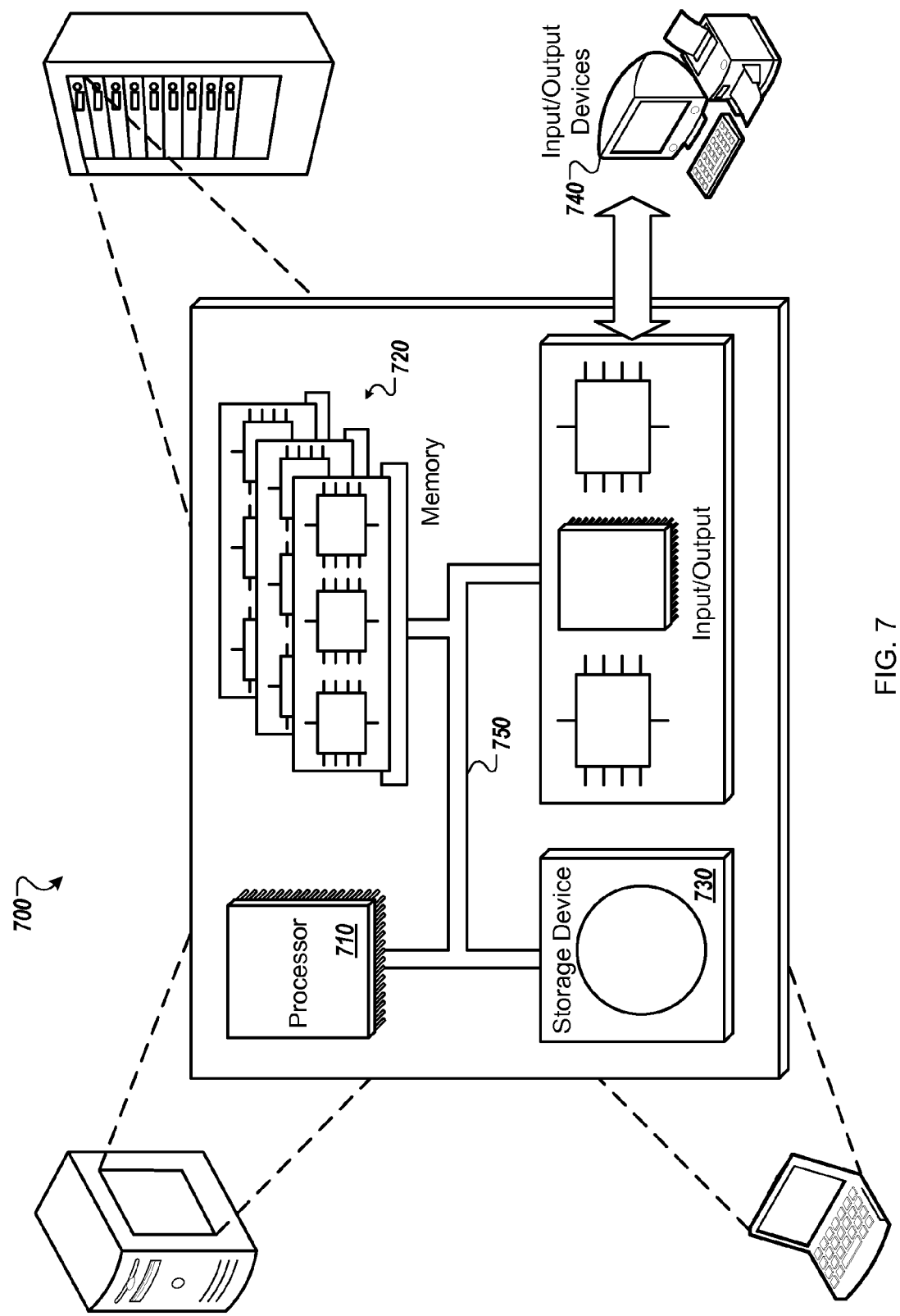
FIG. 7 is a block diagram of an example system for implementing the various operations described in FIGS. 1-6.

FIG. 7 is a block diagram of an implementation of a system for implementing the various operations described in FIGS. 1-6. The system 700 can be used for the operations described in association with the processes 300, 400, 500, or 600 according to several implementations.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The storage device 730 can be used, for example, to store the logo processing algorithm 106.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed:

1. A method, comprising:
receiving a current frame, the current frame including one or more macroblocks;
analyzing the current frame using a first set of image characteristics to determine if logo detection should be performed on the current frame without performing the logo detection, wherein analyzing the current frame comprises determining whether a portion of current frame's macroblocks have a motion vector whose horizontal or vertical component exceeds a predetermined speed threshold without analyzing every macroblock of the current frame; and performing the logo detection on the one or more macroblocks of the current frame only if the current frame satisfies the first set of image characteristics to determine a presence of a logo macroblock among the one or more macroblocks, wherein performing the logo detection on the one or more macroblocks of the current frame is performed without separately analyzing every pixel of the one or more macroblocks by performing:

identifying a macroblock in the current frame and a matching macroblock in a reference frame;

identifying a motion vector that points to the matching macroblock in the reference frame; and determining the encoded macroblock as the logo macroblock if both vertical component and horizontal component of the motion vector do not meet a predetermined magnitude.

2. The method of claim 1, further comprising:
analyzing whether the current frame and the reference frame is separated by a scene change; and
performing the logo detection includes performing the logo detection only if the current frame and the reference frame are not separated by a scene change.

3. The method of claim 1, further comprising:
analyzing whether the current frame or the reference frame is associated with a flash, fade or dissolve; and
performing the logo detection includes performing the logo detection only if the current frame or the reference frame are not associated with a flash, fade or dissolve.

4. The method of claim 1, wherein determining the macroblock further includes determining the macroblock in the current frame as the logo macroblock when both of the vertical component and the horizontal component of the motion vector do not meet a predetermined magnitude, and the encoded macroblock has a luma variance, texture or edges that meet a predetermined threshold.

5. The method of claim 1, wherein if the current frame does not satisfy the first set of image characteristics, the method further comprising:
enabling usage detection using a previously detected bitmap storing results of the logo detection associated with one or more previous detection frames to determine the presence of the logo macroblock for the current frame.

6. The method of claim 5, further comprising:
re-performing the logo detection on the current frame to replace the previously detected bitmap with logo detection results associated with the current frame.

7. The method of claim 5, further comprising:
identifying a previous detection frame;
analyzing the current frame to determine if the current frame has at least one of a same size, structure or parity as the previous detection frame; and
determining a macroblock in the current frame as the logo macroblock if a corresponding macroblock in the previous detection frame has previously been identified as a logo macroblock.

8. The method of claim 7, wherein determining the macroblock further includes determining the macroblock in the current frame as the logo macroblock when the corresponding macroblock in the previous detection frame has previously been identified as a logo macroblock, and the macroblock in the current frame has a luma variance, texture or edges that meet a predetermined threshold.

9. The method of claim 1, further comprising:
performing a post-process on the current frame after performing the logo detection to remove isolated detection decision or to detect a previously non-detected macroblock surrounded by one or more positively detected macroblocks.

10. A non-transitory computer-readable storage medium storing one or more sequences of instructions, which when executed by one or more processors, causes:
receiving a current frame, the current frame including one or more macroblocks;
analyzing the current frame using a first set of image characteristics to determine if logo detection should be performed on the current frame without performing the logo detection, wherein analyzing the current frame comprises determining whether a portion of current frame's macroblocks have a motion vector whose horizontal or vertical component exceeds a predetermined speed threshold without analyzing every macroblock of the current frame; and
performing the logo detection on the one or more macroblocks of the current frame only if the current frame satisfies the first set of image characteristics to determine a presence of a logo macroblock among the one or more macroblocks,
wherein performing the logo detection on the one or more macroblocks of the current frame is performed without separately analyzing every pixel of the one or more macroblocks by performing:
identifying a macroblock in the current frame and a matching macroblock in a reference frame;
identifying a motion vector that points to the matching macroblock in the reference frame; and
determining the encoded macroblock as the logo macroblock if both vertical component and horizontal component of the motion vector do not meet a predetermined magnitude.

11. The non-transitory computer-readable storage medium of claim 10, wherein:
analyzing the current frame includes determining whether the current frame has at least one reference frame that is a field-pair complement; and
performing the logo detection includes performing the logo detection if the at least one reference frame is not a field-pair complement.

12. The non-transitory computer-readable storage medium of claim 11, wherein:
analyzing the current frame includes analyzing whether global motion between the current frame and the reference frame satisfies a predetermined speed threshold; and
performing the logo detection includes performing the logo detection if the global motion between the current frame and the reference frame satisfies a predetermined speed threshold.

13. The non-transitory computer-readable storage medium of claim 11, wherein:
analyzing the current frame includes analyzing whether the current frame and the reference frame is separated by a scene change; and
performing the logo detection includes performing the logo detection if the current frame and the reference frame is not separated by a scene change.

14. The non-transitory computer-readable storage medium of claim 11, wherein:

analyzing the current frame includes analyzing whether the current frame or the reference frame is associated with a flash, fade or dissolve; and performing the logo detection includes performing the logo detection if the current frame or the reference frame is not associated with a flash, fade or dissolve.

15. A non-transitory computer-readable storage medium storing one or more sequences of instructions, which when executed by one or more processors, causes:

receiving a current frame, the current frame including one or more macroblocks;

determining whether the current frame is a forward-predictive frame;

upon concluding that the current frame is a forward-predictive frame, analyzing the current frame using a first set of image characteristics to determine if logo detection should be performed on the current frame without performing the logo detection, wherein analyzing the current comprises determining whether a portion of current frame's macroblocks have a motion vector whose horizontal or vertical component exceeds a predetermined speed threshold without analyzing every macroblock of the current frame; and performing the logo detection on the one or more macroblocks of the current frame only if the current frame satisfies the first set of image characteristics to determine a presence of a logo macroblock among the one or more macroblocks, wherein the logo detection performed on the current frame only if the current frame is determined to be a forward-predictive frame, wherein performing the logo detection on the one or more macroblocks of the current frame is performed without separately analyzing every pixel of the one or more macroblocks by performing:

identifying a macroblock in the current frame and a matching macroblock in a reference frame;

identifying a motion vector that points to the matching macroblock in the reference frame; and determining the encoded macroblock as the logo macroblock if both vertical component and horizontal component of the motion vector do not meet a predetermined magnitude.

* * * * *